UNITED STATES PATENT OFFICE.

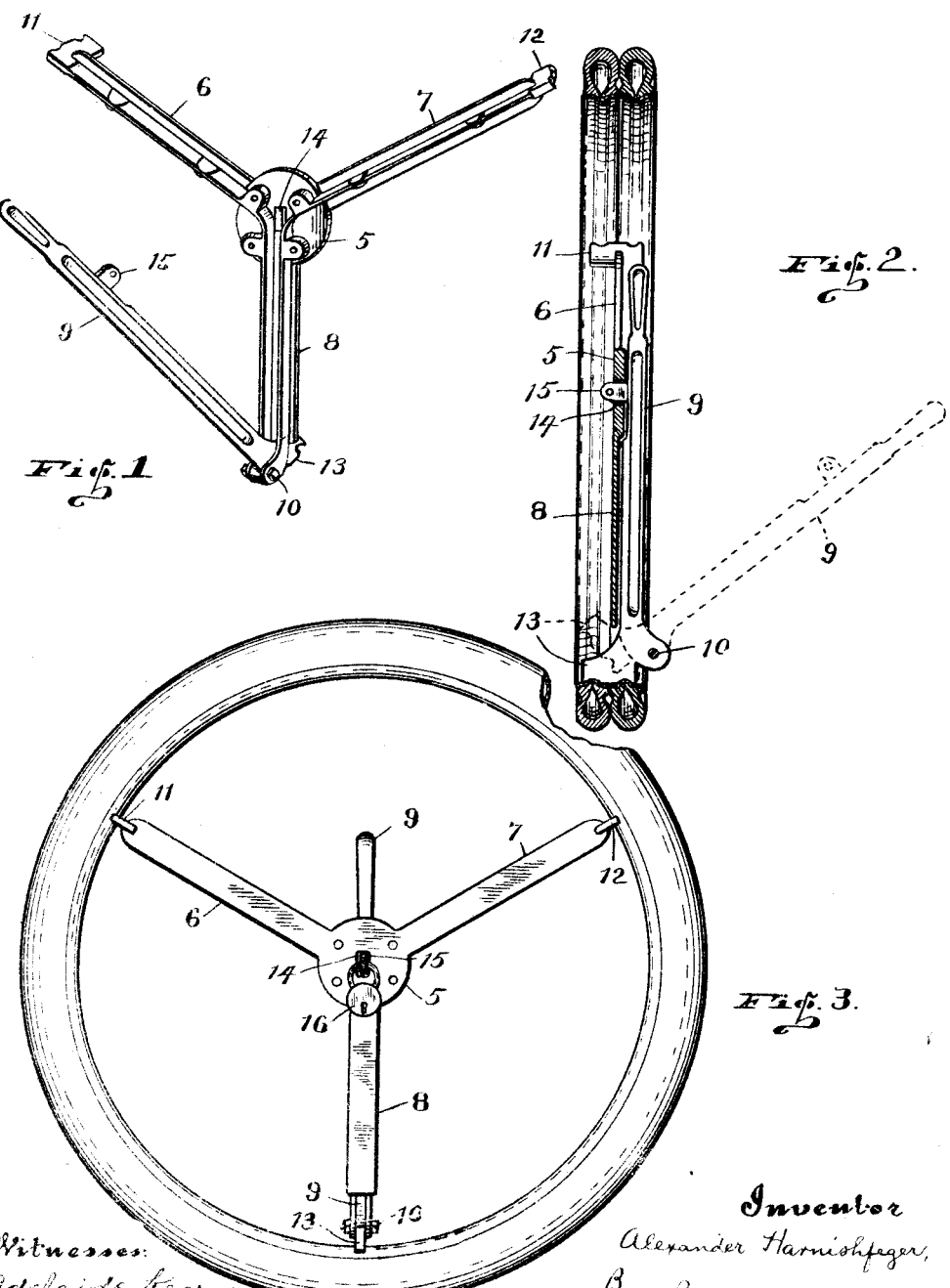

ALEXANDER HARNISHFEGER, OF EVANSVILLE, INDIANA, ASSIGNOR TO RIMOLOX TIRE CARRIER CO., OF EVANSVILLE, INDIANA, A CORPORATION OF INDIANA.

TIRE-CARRIER.

1,141,185.

Specification of Letters Patent.

Patented June 1, 1915.

Application filed September 26, 1914. Serial No. 863,641.

*To all whom it may concern:*

Be it known that I, ALEXANDER HARNISHFEGER, a citizen of the United States, residing at Evansville, in the county of Vanderburg and State of Indiana, have invented certain new and useful Improvements in Tire-Carriers, of which the following is a specification.

My present invention relates to improvements in tire carriers of that character disclosed in Letters Patent No. 1,095,856 issued May 5, 1914, upon my application, and consists in certain details of construction and arrangements of parts whereby I am enabled to produce a more serviceable and neater appearing device for the purpose, which can be conveniently manipulated and is more positive in operation, and which may be secured to the vehicle at any desired point without the use of a foot-piece or other protruding element of an unsightly or otherwise objectionable character, as will hereinafter more fully appear.

In the accompanying drawing, which forms a part hereof, Figure 1 is a perspective of my improved tire carrier; Fig. 2, a transverse section of the same showing tires mounted thereon, and Fig. 3 is a side elevation of said carrier as it appears when a tire is secured thereon.

In said drawing the portions marked 5 indicate a central base-plate having suitable apertures therein for bolting or otherwise securing the same to a vehicle, preferably the chassis thereof, so that I do not disturb or mar the ornamental body of the vehicle in applying my improved tire-carrier thereto. Radiating from said plate 5 are tire-supporting arms, 6, 7, upon which the demountable rim of a tire is placed preparatory to being clamped in position, and depending from said plate is also an arm, 8, of less length than the arms 6, 7. At the end of said arm 8 I attach a clamping lever, 9, by a suitable pivot-pin or bolt, 10, which lever preferably lies in a groove in said arm and terminates in an elongated handle extending above base-plate 5 where it can be conveniently grasped when mounting a tire upon the carrier. Each of the arms 6, 7, and clamp 9 are provided with appropriate seats, 11, 12, 13, having notches in their outer ends substantially as indicated in Fig. 1, for the reception of tire rims, said notches being designed to conform to the contour of ordinary commercial demountable tire rims or parts associated therewith. Base-plate 5 is provided with an opening, 14, through which a staple, 15, or other suitable means on lever 9 projects, so that the device may be fixedly maintained in clamping position, or positively locked as by a padlock, 16, or other appropriate means.

As will be readily apparent, when it is desired to mount a tire (or tires) upon the carrier, the tire rim is placed in engagement with the proper set of notches in the ends of arms 6, 7, and the lower notched end of lever 9 is also brought into engagement with the inner face of the rim and pulled forward until its staple or eye projects through opening 14 in base-plate 5. By reference to Fig. 2, where lever 9 is shown in full and dotted lines, it will be noted that said lever is capable of a wide range of movement, which is of advantage in that I am enabled to impart an extremely rigid clamping effect to the rim, so that it will be equally gripped by the arms 6, 7, and fixedly held in position without rattling or otherwise moving on its supports. When a tire is thus clamped in position lever 9 may be secured to plate 5 by a padlock or other suitable means, which insures that the device as a whole is immovably held in clamped position and the removal of said tire prevented until said lever is released and swung away from the rim.

By my present improvement I not only produce a neat and inexpensive device for the purpose but one that is highly efficient and conveniently operable, and am thus enabled to securely support and carry tires without the use of cumbersome binding devices or straps, which are not only unsightly but detrimental to rubber tires where such devices come in contact therewith, and which means require frequent repairing and renewal, while my device, being wholly constructed of metal, is highly durable and does not come into direct contact with the tire, at the same time positively securing the same against theft, which is not prevented by the employment of ordinary straps or the like.

I claim as my invention.

1. A tire-carrier comprising a base-plate, arms radiating therefrom and having tire-supporting seats at their outer ends, an arm depending from said plate, and a lever mounted upon said arm and having a tire-supporting seat at its outer end and terminating in a handle extending above said base-plate.

2. A tire-carrier comprising a base-plate, arms radiating therefrom and having tire-supporting seats at their outer ends, an arm depending from said plate, a lever mounted upon said arm and having a tire-supporting seat at its outer end and terminating in a handle extending above said plate, and means for securing said lever to said plate.

3. A tire-carrier comprising a base-plate adapted to be affixed to a vehicle and having an opening therethrough, tire supporting arms radiating from said base-plate, a lever mounted upon one of said arms and having tire supporting means at its outer end, said lever terminating in a handle and extending above said plate, means on said lever for registering with the opening in said plate, and means for securing said lever and plate together.

4. A tire-carrier comprising a base-plate, upper tire supporting arms associated with said plate, a lower arm associated with said plate and shorter in length than said upper arms, a clamping lever mounted upon the lower end of said arm and extending above said base-plate for conveniently swinging the same, and means associated with said lever for securing the same to said base-plate.

In testimony whereof I affix my signature in presence of two witnesses.

ALEXANDER HARNISHFEGER.

Witnesses:
 MOSES A. KRAUSE,
 WILBUR N. ERSKINE.